United States Patent [19]

Hempel

[11] Patent Number: 4,899,977

[45] Date of Patent: Feb. 13, 1990

[54] METHOD AND APPARATUS FOR THE MANUFACTURE OF FILLER STICKS FOR COSMETIC STICKS AND THE LIKE

[76] Inventor: Matthias Hempel, Grossgeschaidt 243, D-8501 Heroldsberg, Fed. Rep. of Germany

[21] Appl. No.: 219,748

[22] Filed: Jul. 15, 1988

[30] Foreign Application Priority Data

Aug. 13, 1987 [DE] Fed. Rep. of Germany ....... 3726996

[51] Int. Cl.⁴ ............................................. B28B 13/06
[52] U.S. Cl. ......................................... 249/68; 249/96;
249/118; 249/119; 249/129; 264/259;
264/297.1; 264/297.8; 264/275; 264/279;
264/267; 425/117; 425/441; 425/444; 425/803;
425/DIG. 32
[58] Field of Search .............................. 425/253–256,
425/500–502, 117, 120, 325, 404, 436 R, 436
RM, 438, 383, 385, 470, 215, DIG. 32, DIG.
117, DIG. 118, DIG. 219, 803, 123, 127;
264/259, 297.1, 297.8, 241, 242, 246, 271.1,
DIG. 64, 267, 268, 274, 330, 275, 279, 269, 354;
249/80, 81, 83–85, 91–94, 117, 119, 120, 144,
142, 141, 177, 96, 97, 122, 124, 105, 173, 89,
107, 109, 68, 69, 70, 71

[56] References Cited

U.S. PATENT DOCUMENTS

| | | | |
|---|---|---|---|
| 330,109 | 11/1885 | Goodman | 249/97 |
| 1,166,312 | 12/1915 | Barten | 249/118 |
| 1,312,189 | 8/1919 | Locke | 425/803 |
| 1,312,325 | 8/1919 | Hinck | 249/97 |
| 1,825,427 | 9/1931 | Siddall | 264/274 |
| 2,011,477 | 8/1935 | Fischer | 249/96 |
| 2,263,302 | 11/1941 | Johnson | 425/117 |
| 2,564,624 | 8/1951 | Hoos | 264/335 |
| 2,879,548 | 3/1959 | Croce et al. | 264/242 |
| 3,526,694 | 9/1970 | Lemelson | 264/259 |
| 4,230,655 | 10/1980 | Kruckel | 425/DIG. 32 |
| 4,664,615 | 5/1987 | Ohtomo et al. | 249/125 |
| 4,686,073 | 8/1987 | Koller | 249/96 |

Primary Examiner—Jeffery Thurlow
Assistant Examiner—Mathieu Vargot
Attorney, Agent, or Firm—Browdy and Neimark

[57] ABSTRACT

In a method and an apparatus for producing filler sticks for cosmetic sticks, in particular those having a swiveling mechanism for extending the filler sticks from a protective sheath, including a mold for casting the filler sticks, it is provided, in order to attain filler sticks that are optimally suitable for such swiveling mechanism and to attain a filler stick structure that assures favorable properties for use, that the filler stick is cast in a horizontally disposed mold recess open along at least a portion of its jacket face. For performing a method of this kind, an apparatus is used that is distinguished in that the mold has a plurality of horizontally disposed mold recesses, which are open along at least a portion of the jacket face, and that an expulsion device for the hardened, cast filler sticks is provided, acting in the axial direction of the mold recesses.

3 Claims, 1 Drawing Sheet

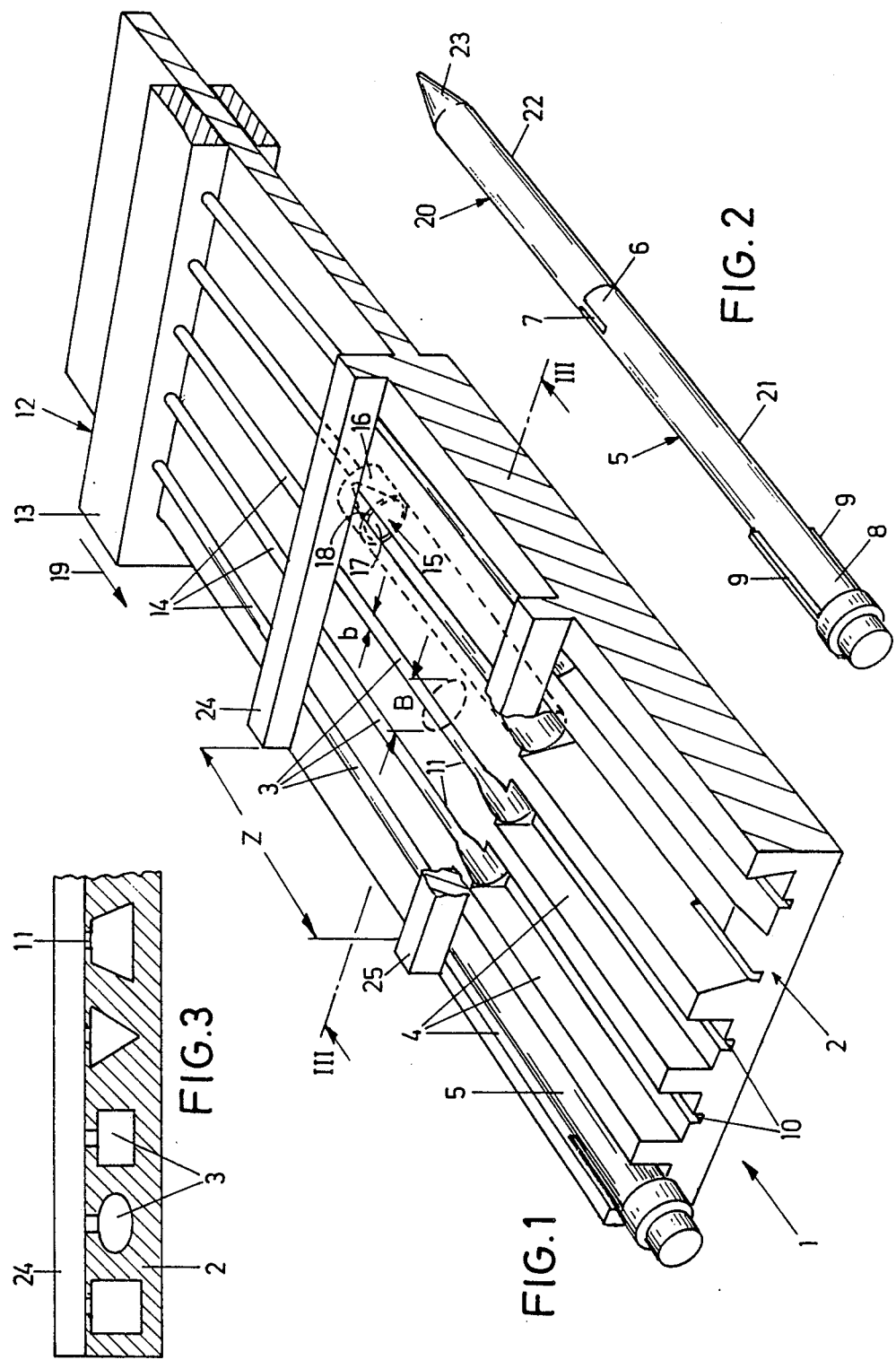

METHOD AND APPARATUS FOR THE MANUFACTURE OF FILLER STICKS FOR COSMETIC STICKS AND THE LIKE

BACKGROUND OF THE INVENTION

1. Field of the Invention

The invention is directed to a method and an apparatus for producing filler sticks for cosmetic sticks, such as lipsticks, and the like, in particular having a swiveling mechanism for extending the filler stick from a protective sheath, in which the filler stick is poured into a mold and after cooling setting is removed from the mold.

2. The Prior Art

Filler sticks of cosmetic sticks, such as lipsticks, and the like must have a very well-defined consistency, so that once finished, they will have the desired usage properties. In order to be applied as cosmetics, the filler sticks must have a certain softness or creaminess, yet that makes them vulnerable to mechanical surface damage and deformation.

For manufacturing such filler sticks, it is known to provide vertical, cup-shaped molds into which the molding composition is poured, and to cool the mold in order to accelerate hardening and facilitate removal of the filler sticks.

Filler sticks produced in this way are usually inserted into retaining elements. This function is performed as part of a swiveling mechanism for extending the filler stick out of a protective sheath, which is intended to protect it from the aforementioned mechanical damage, and, in an embodiment particularly preferred by the user, for swiveling it back into the sheath as well. Conventionally, the connection between the retaining element and the filler stick is produced by inserting the finished, molded filler stick form-fittingly or with frictional engagement into the cup-shaped end of the retaining element. This causes the cup-shaped end of the retaining element to encompass the end of the filler stick inserted into it, in such a way that some play remains, depending on the wall thickness of the end of the retaining element between the outer wall of the filler stick and the protective sheath into which the filler stick and retaining element are inserted. This free space can mean that at an elevated temperature, for instance when kept in a handbag placed in the sun or in the glove compartment of a car, the filler stick will bend, and then harden again once the phase of elevated temperature is ended, so that the next time the swiveling mechanism is actuated the filler stick will break, or will at least suffer substantial damage.

With relatively thick filler sticks, it is known to avoid such a play, by pressing spindle-like extensions of the retaining element into the inside of the filler stick, in order to join the retaining element to the filler stick.

Securing a filler stick to such spindles and inserting the filler stick into a cup-shaped recess are two separate operations, in addition to the actual production of the filler sticks, and the manipulations themselves carry the risk of damage to the filler stick, hence increasing the number of rejects produced. A further problem with filler sticks typically produced in vertical mold recesses is that especially when numerous mold recesses of this kind are combined into one mold block, for the sake of more economical production, it is extremely difficult to attain a desirable temperature control. Even though cooling channels, for example, are provided in the body of the mold block, the desired crystal structure that is particularly suitable for this particular application is not optimally attainable in this way.

A further problem is that because of gravity, on the one hand, and because of the prevailing temperature gradients on the other, structural irregularities occur in the conventional vertical mold recesses during cooling and hardening, which have a negative effect on the properties for use; in particular, when pigments to provide a pearly or lustrous appearance are used, undesired nonhomogeneous structures form.

Relatively thin filler sticks are typically extruded in the form of a strand, then cut and finally sharpened. When the filler sticks are cut and sharpened, they must be mechanically held, which exposes the relatively soft surface of the filler stick to the danger of being damaged. In a previously known method for producing thin filler sticks by casting methods, the casting composition is introduced via a dispensing needle introduced into the casting mold; as the fill level of the mold increases, the dispensing needle is moved from bottom to top, out of the vertical mold. This method is extraordinarily labor intensive, because it requires that each individual mold recess be individually handled during incremental filling, and moreover, still has the basic disadvantages of forming a filler stick in the axial direction.

SUMMARY OF THE INVENTION

Taking the above situation as a point of departure, it is the object of the present invention to embody a method and an apparatus of the type described initially such that filler sticks that are particularly well suited for use in cosmetic sticks having swiveling mechanisms can be economically produced, with a homogeneous structure that assures optimal properties for use. It is also an object to enable efficient manufacture of even relatively thin filler sticks.

This object is attained by means of a method of the type described above, in which the filler stick is poured into a horizontally disposed mold recess that is open on at least part of its jacket face.

This provision overcomes one prejudice of those skilled in the art, who assumed that the outside of such filler sticks must have a perfectly cylindrical configuration, and hence believed that correspondingly shaped vertical molds were necessary. By comparison, it was recognized in accordance with the invention that the advantages, in terms of the manufacturing technique, attained by the use of horizontal mold recesses are quite important both per se and in terms of the finished filler sticks; in many cases, the deviation from a precisely round configuration can even be advantageous in itself. Such filler sticks are in fact particularly well suited for use in swiveling mechanisms that comprise only a very few parts (as a rule, three), but this can be attained only if the filler stick is secured against relative rotation. By shaping it such that it is not circular, it can be secured against relative rotation in a particularly simple manner. Moreover, filler sticks having an elongated cross section of some kind or other also have the advantage, in terms of the intended application, that relatively thin lines can be applied with sticks of relatively great intrinsic strength.

In particular, the method according to the invention can economically be used to produce relatively thin filler sticks, that is, filler sticks having a diameter of 4 mm or less, for example.

A further fundamental advantage of the method according to the invention is that in contrast to conventional casting methods, in which the filler stick was built up in the axial direction, there is no practical restriction in terms of the maximum filler stick length, because the casting composition hardens from the jacket surface inward. Hence filler sticks of even more than 12 cm in length, of small diameter, can be produced without difficulty.

The basic difference between the method according to the invention and all the other previously known manufacturing methods is accordingly that the body of the filler stick is cast in a direction at right angles to its longitudinal extension, or in other words radially through a slot in the mold cavity side wall, while in the conventional production of such filler sticks for cosmetics a mold cavity was always progressively filled in the axial direction in some manner or other.

Advantageously, the filler sticks are ejected in the axial direction after hardening. As a result, the opening at the top of the mold recesses can be embodied as quite narrow in comparison with the maximum width of these mold recesses.

In a manner known per se, the mold can be cooled prior to the expulsion of the filler sticks. This kind of cooling can also be attained particularly easily and at little expense with horizontally arranged mold recesses, as compared with conventional mold blocks.

Casting the filler sticks horizontally also particularly advantageously makes it possible to cast the filler sticks directly onto a retaining element of a swiveling mechanism. As a result, on the one hand, a separate securing operation can be dispensed with, while on the other hand this also makes it possible to assure that the outside of the retaining element and of the filler stick are precisely flush, to enable a largely playfree guidance of the filler stick and the retaining element in the protective sheath.

The object of the invention is also attained by an apparatus for producing filler sticks for cosmetic sticks that includes a mold for casting the filler sticks, the mold having a plurality of horizontally disposed mold recesses that are open along at least a portion of their jacket face, as well as by expulsion devices for the hardened, cast filler sticks that act in the axial direction of the mold recesses.

Mold recesses of this kind, disposed beside one another in a plate-like mold, are simple to fill without using a dispensing device; the paste-like casting compound is brushed into the mold recesses from the top by hand or by machine, and excess casting composition can be simply scraped off and re-used. Advantageously, a bearing recess, each for one part of the retaining element forming the swiveling mechanism, is provided in an extension of each mold recess. In this way, direct molding of the filler stick onto the retaining element during the casting process is possible, and a separate operation and the associated damage to the filler stick that may occur in the course of it are avoided; moreover, the outer wall of the retaining element and of the filler stick can be made precisely flush. Furthermore, a very firm seat of the filler stick in the retaining element is attained, especially if a kind of toothed, form-fitting connection between the cast-in, hardened filler stick composition and the retaining element is attained by providing a slit in the end of the retaining element nearer the opening.

In a particularly advantageous feature, the opening of the mold recesses has the form of a longitudinal slit on the top, the width of the slit being less than the width of the widest point of the mold recess, which is preferably 2 to 5 times wider. With this configuration, a reliable, absolutely uniform filling of the mold recesses is attained, and in contrast to conventional vertical mold recesses it is assured that air bubbles will not form, whereas conventionally, the avoidance of air bubbles is accomplished at relatively great engineering effort. On the other hand, the slight width of the longitudinal slits only slightly interrupts a possibly rounded cross-sectional configuration, so that the appearance is virtually unimpaired. For esthetic reasons, the mold recess may be correspondingly flattened on its underside opposite the longitudinal slit, to lend the finished filler stick a symmetrical appearance.

The mold recesses are advantageously approximately elliptical in cross section. With this configuration, an outer contour that appears visually smooth is possible, and the basic shape of the ellipse is little impaired by the flattening in the vicinity of the longitudinal slit, if the long half-axis of the ellipse cross section extends parallel to the top of the mold. Furthermore, this shape is particularly suitable for cosmetic sticks having a swiveling mechanism, since because of the elliptical shape the filler sticks can be secured against relative rotation, and so the swiveling mechanism can be particularly simple in design. In principle, naturally, other cross-sectional shapes are also possible, such as an approximately rectangular, triangular or approximately round cross-sectional shape.

It is advantageously provided that the front end of the expulsion device, resting in each mold recess, completely fills up the mold recess crosswise and has a point-forming recess. As a result, the mold recess is closed at the end remote from the retaining element, and when the filler stick is expelled the expulsion pressure is transmitted over a relatively large surface area; also, the point can be shaped at the same time as the casting, and this assures that the point is not damaged in the expulsion process.

Application frames can be disposed in the vicinity of the ends of the mold recesses, extending at right angles to them. These frames prevent pasty filler stick composition that has been applied from getting into the area laterally of the mold recesses, so that the filler stick composition can be applied easily, and excess composition can easily be removed again.

Finally, cooling devices may also be disposed along the underside of the mold. Because of the relatively large surface area of the basic mold, as a result of the horizontal mold recesses disposed beside one another, a homogeneous distribution of temperature along the entire mold recess is particularly easy to accomplish, and a correspondingly purposeful control of temperature can be attained. The disposition of cooling devices at the underside can be done without great engineering effort, and the function of the cooling devices, independently of filling and unmolding operations performed at the top of the mold, is assured.

BRIEF DESCRIPTION OF THE DRAWINGS

Further characteristics, advantages and details of the invention will become apparent from the ensuing description of a preferred embodiment, referring to the drawings, in which:

FIG. 1 is a perspective view illustrating the basic principle of the apparatus according to the invention;

FIG. 2 is a perspective view of a filler stick molded onto a retaining element; and FIG. 3 is a section taken along the line III—III of FIG. 1.

DETAILED DESCRIPTION OF THE PREFERRED EMBODIMENT

The mold 1 shown in the drawing includes a plate 2, on the upper face of which a plurality of mold recesses 3 are disposed; in FIG. 1, only part of this plate 2 is shown. In actuality, the plate may extend far enough that it can receive a quite considerable number of mold recesses 3.

As shown in FIG. 1, and particularly in the cross-sectional view of FIG. 3, the mold recesses 3 may have quite a number of various cross sections, for instance being elliptical, rectangular, triangular, trapezoidal and so forth. As a rule, however, unlike what is shown in the drawing for the sake of illustration, a given mold 1 will include only one type of mold cross section, for example elliptical.

Each mold recess 3 merges with a bearing recess 4 for receiving a retaining element 5, which is part of a swiveling mechanism not shown in detail.

Each retaining element has an elliptical cross section, for example, and is provided on one end 6 with slits 7 and on its other end 8 with guide ribs 9, which engage corresponding guide recesses 10 in the bearing recesses, in order to assure a defined orientation of the retaining elements 5 upon insertion into the mold 1.

The mold recesses 3 are open at the top, with the provision there of a longitudinal slit 11 the width b of which is considerably less than the maximum width B of the mold recesses 3. The end 6 of the retaining element 5, in the inserted state of the retaining element, protrudes into the mold recesses 3, so that while the mold recesses 3 are being filled along the application zone Z with filler stick composition, this end 6 of the retaining element 5 is surrounded with composition, such that the composition extends relatively far into the interior of the retaining element 5, as it does into the slits 7 provided there, which produces a very firm, form-fitting connection between the retaining element 5 and the filler stick composition hardening in the mold recess 3. The jacket faces of the retaining element 5 and of the resultant filler stick are flush with one another. An expulsion device 12 for the finished filler sticks includes, in the exemplary embodiment, a pusher 13 on which a plurality of push rods 14 is disposed. The push rods are parallel to one another and in alignment with the mold recesses 3. A point-forming device 15 is provided at the front end of the push rod 14, this device being embodied by a block 16, which completely fills the cross section of the mold recess 3, and a mold recess 17 on the face end 18 of the block 16 oriented toward the mold recess 3.

For demolding of the filler stick composition introduced via the longitudinal slits 11, the demolding device 12 is moved in the direction of the arrow 19, after cooling of the filler stick composition in accordance with a desired cooling profile has been effected, by means of a cooling device not shown in the drawing. Because of the relatively large area of the embodiment of the apparatus, an extremely uniform distribution of temperature along the filler stick is attained.

Once the demolding device 12 has been actuated, a unit as shown in FIG. 2 has been obtained, comprising a retaining element 5 and a filler stick 20 molded onto it, with the jacket faces 21, 22 of the unit being precisely flush; the filler stick 20 already has a finished point 23, so that after the casting operation, the overall apparatus comprising the retaining element 5 and the filler stick 20 can be mounted, without any further finishing operations, in a protective sheath having a swiveling mechanism. For defining the application zone Z, application frames 24, 25 are provided, which extend along the ends of the mold recesses 3 at right angles to their longitudinal extension and prevent filler stick composition from getting into areas outside the mold recesses 3.

Application frames 24, 25 are disposed in the vicinity of the ends of the mold recesses 3, extending at right angles thereto. The frames prevent any pasty filler stick composition that has been applied from getting into the area laterally of the mold recesses, so that the filler stick composition can be applied easily, and excess composition can easily be removed.

The foregoing relates to a preferred exemplary embodiment of the invention, and various changes and modifications may be made by those skilled in the art without departing from the scope of the invention, as defined by the appended claims.

What is claimed is:

1. An apparatus for producing round or elliptic filler sticks for cosmetic sticks, comprising
    a mold for casting the filler sticks in the form of a plate having a plurality of mold recesses disposed horizontally beside one another and parallel to one another, the mold recesses having an essentially round or elliptic cross section, wherein a longitudinal filling slot is provided in the mold plate along the length of each recess on its upper side, the width of the filling slot being considerably smaller than the maximum width of the mold recess, each mold recess being comparatively long and thin in relation to its maximum width;
    expulsion means for demolding the hardened, cast filler sticks in the longitudinal direction of the mold recesses, wherein the direction of movement of the expulsion means runs parallel to a longitudinal extension of the filling slot, an end of the expulsion means facing the mold recess forming a transverse end wall of said mold recesses, said expulsion means being commonly driven;
    and application frames disposed in the vicinity of the ends of the mold recesses extending at right angles to them.

2. An apparatus as defined by claim 1, further comprising bearing recesses extending from the ends of said mold recesses opposite said expulsion means, each of said bearing recesses being adapted to receive therein a retaining element for uniting with a filler stick, wherein the bearing recesses comprise guide recesses into which corresponding guiding ribs of the retaining elements are adapted to be inserted.

3. An apparatus as defined by claim 1, wherein the filling slot width is from 2 to 5 times less than the greatest width of the mold recess.

* * * * *